United States Patent [19]
Wlassics et al.

[11] Patent Number: 5,276,216
[45] Date of Patent: Jan. 4, 1994

[54] PROCESS FOR OXIDIZING AROMATIC AND ALIPHATIC COMPOUNDS

[75] Inventors: Ivan Wlassics, Rapallo; Fulvio Burzio, Milan, both of Italy

[73] Assignee: Ausimont S.p.A., Milan, Italy

[21] Appl. No.: 967,084

[22] Filed: Oct. 27, 1992

[30] Foreign Application Priority Data

Oct. 28, 1991 [IT] Italy .................. MI91 A 002855

[51] Int. Cl.$^5$ .................. C07C 37/60; C07C 29/48
[52] U.S. Cl. .................. 568/803; 568/741;
568/754; 568/771; 568/800; 568/910
[58] Field of Search .............. 568/803, 815, 771, 741,
568/902, 768, 754, 800, 910

[56] References Cited

U.S. PATENT DOCUMENTS

Re. 33,779  12/1991  Koni et al. .................. 568/803

FOREIGN PATENT DOCUMENTS

| | | | |
|---|---|---|---|
| 0068582 | 1/1983 | European Pat. Off. | 568/803 |
| 0126394 | 11/1984 | European Pat. Off. | 568/803 |
| 1543703 | 9/1969 | Fed. Rep. of Germany | 568/803 |
| 2064497 | 7/1971 | Fed. Rep. of Germany | 568/803 |

OTHER PUBLICATIONS

Biotechnology and Bioengineering, vol. 26, No. 7, Jul. 1984, New York, pp. 737–741, D. Nies et al. "Use of Catalase From *Escherichia coli* in Model Experiments For Oxygen Supply of Microorganisms With Hydrogen Peroxide".

Chemical Abstracts, vol. 103, No. 7, 19 Aug. 1985, Columbus, Ohio, US; abstract No. 50280g, p. 243.

Biotechnology and Bioengineering Symp. No. 1, 11 May 1981, New York, pp. 373–379, Barbara N. Alberti et al. "Enzymatic Removal of Dissolved Aromatics From Industrial Aqueous Effluents".

*Primary Examiner*—Werren B. Lone
*Attorney, Agent, or Firm*—Bryan Cave

[57] ABSTRACT

Process for oxidizing aromatic and aliphatic compounds, by using, in aqueous solution, an enzymatic system constituted by hydrogen, peroxide as the oxidizer compound, peroxidase and activated oxygen, or an enzyme which releases activated oxygen from $H_2O_2$.

In the preferred process, the enzymatic system is a double-enzyme one, in which peroxidase and catalase are used as enzymes.

17 Claims, No Drawings

PROCESS FOR OXIDIZING AROMATIC AND ALIPHATIC COMPOUNDS

The present invention relates to an enzymatic process for oxidizing aromatic and aliphatic compounds.

More in particular, the present invention relates to a process for oxidizing aromatic and aliphatic compounds by using an enzymatic system which is composed by hydrogen peroxide, peroxidase and activated oxygen, or an enzyme which liberates activated oxygen from $H_2O_2$.

Industrial and waste waters contain noxious and toxic aromatic and aliphatic compounds. The methods known from the prior art in order to degrade or remove these compounds from such waters include adsorption on activated charcoal, various kinds of extractions, microbiological and chemical oxidations, electrochemical techniques and irradiation techniques (Slein, M. W. and Sansone, E. B. Degradation of Chemical Carcinogens, Van Nostrand Reinhold Co., New York, 1980).

Each of these methods displays drawbacks: some of them are expensive, in other methods the purification is not complete and/or toxic byproducts can be produced, still other processes suffer from low efficiency.

Besides the above, other methods have been described in literature, which make use of enzymes (A. M. Kibanov and E. D. Morris, Enzyme Microb. Technol., 1981, Vol. 3, April), as horseradish peroxidase, which catalyses the oxidation of aromatic amines and phenols, using, as the oxidizer means, hydrogen peroxide, accelerating the transformation of the water soluble organic compounds into water-insoluble species. Unfortunately, this process is unsuitable for oxidizing benzene, and the total yields of oxidated substances is low.

Another enzymatic process known from the prior art (V. D. Artemchik and D. I. Metalitsa; Prikladnaya Biokhimiya i Mikrobiologiya, Vol. 25, No. 5, pages 644–650, September–October, 1989) relates to the oxidation of ortho-dianizidine (substrate) catalysed by peroxidase or catalase, with the latter being in the form of dissociated sub-units. This form of catalase shows a meaningful peroxidasic activity. In this process, catalase is used in a solution containing water and formaldehyde, and in the presence of cumene hydroperoxide. The presence of dimethylformamide performs the task of transforming the structure of catalase into sub-units with peroxidasic functionality. The process takes place in the organic phase, and therefore requires the use of an organic peroxide.

The dissociated form of catalase retains its peroxidasic activity for a longer time period than peroxidase which, on the contrary, loses its activity under the process conditions.

Unfortunately, dissociated catalase displays a meaningfully lower activity (i.e., 150–400 times lower) than of peroxidase: the oxidation yield is consequently low as compared to peroxidase process.

Therefore, the purpose of the present invention is of overcoming the drawbacks shown by the processes known from the prior art, as reported hereinabove, and providing a quick and cheap process for oxidizing the aromatic and aliphatic compounds with a high yield, which process, finally, does not require the use of organic or toxic solvents or reactants.

The purpose of the present invention is of obtaining a process for oxidizing organic compounds, which is very effective, ecological and inexpensive.

The above recited purpose is achieved according to the present invention by a process for the oxidation of aromatic and aliphatic compounds, which is characterized in that an enzymatic system is used in aqueous solution, which enzymatic system is constituted by hydrogen peroxide used as the oxidizer compound, peroxidase and an activated oxygen, or an enzyme which liberates activated oxygen from $H_2O_2$.

The process according to the present invention takes place with a considerably higher rate than with peroxidase alone. The explanation for such a behaviour is due to the presence in the system of an activated oxygen.

The enzymatic system of the process according to the present invention preferably is a double-enzyme one, in which peroxidase and catalase are used as the enzymes. Catalase is used as an enzyme which liberates activated oxygen by catalysing the disproportionation of oxygen peroxide.

Catalase retains its native quaternary structure in water, and catalyses the disproportionation of hydrogen peroxide according to the well-known equation:

$$H_2O_2 \rightarrow \tfrac{1}{2}O_2 + H_2O$$

The catalase with quaternary structure catalyses the oxidation of short-chain primary alcohols and aldehydes; it does not catalyse the oxidation of other aliphatic and aromatic compounds.

According to the process of the present invention, the simultaneous use of peroxidase and catalase in an aqueous solution in the presence of oxygen peroxide has a synergistic effect on the oxidation of organic compounds.

In fact, a process using catalase alone does not catalyse the oxidation of aromatic and aliphatic compounds; on the contrary, the oxidation by means of the double-enzyme system (simultaneous use of peroxidase plus catalase) is faster than when peroxidase alone is used. Therefore, a synergistic effect between peroxidase and catalase exists in the process according to the present invention.

The preferred process according to the present invention is an oxidation of aromatic and aliphatic compounds (substrates) catalysed by a double-enzyme system. The enzymes, i.e., peroxidase and catalase, are used in concentrated form, as extracts from the organisms, mostly of vegetable character, which contain them, or in diluted form, as raw vegetable product.

The enzymes are used in combination with hydrogen peroxide in such a way that the amount of peroxidase is comprised within the range of from 2,000 U/l to 40,000 U/l, and the amount of catalase is comprised within the range of from 900 U/l to 10,000 U/l. The preferred range for peroxidase is of from 8,000 U/l to 25,000 U/l, whereas catalase is preferably used in an amount of from 3,000 U/l to 8,000 U/l.

Hydrogen peroxide is added as a diluted aqueous solution. The amount thereof in said aqueous solution is comprised within the range of from 0.2 g/l to 10 g/l of aqueous solution, expressed as 100% $H_2O_2$, and preferably is comprised within the range of from 1.5 to 7 g/l.

In the process according to the present invention, the pH value of the aqueous solution is adjusted within the range of from 5.5 to 8, and preferably within the range of $6.5 \pm 0.5$ pH units. For that purpose, buffering alkaline substances can be used, such as, e.g., sodium carbonate, sodium hydrogencarbonate, sodium acetate, and so forth.

The process according to the present invention can be carried out at all temperatures comprised within the range of from 0° C. to 100° C., with temperature values comprised within the range of from 10° C. to 45° C., and, in particular, room temperature, being preferred.

During the process of the present invention, the reaction mixture is kept with mild stirring.

If the substrate (i.e., the compound to be oxidized) has a low solubility in water, the use of a co-solvent can be necessary in order to be able to perform reactions in aqueous phase. The co-solvent homogenizes the reaction mixture and therefore is used in the minimal amount as necessary in order to obtain said solution. Examples of such commonly used co-solvents are ethanol and acetone.

According to the preferred process, the oxidation of aromatic and aliphatic compounds is carried out in an aqueous solution of peroxidase and catalase, bay causing the reaction mixture to equilibrate for a few minutes. The oxidation reaction is started by adding $H_2O_2$ dropwise, very slowly, in order to constantly keep the concentration of hydrogen peroxide in the reaction medium comprised within the range of from 1 mM to 3 mM, thus preventing both peroxidase and catalase from being deactivated and denaturated.

The oxidation of the waste liquors is monitored by gas-chromatographic way and periodically measuring C.O.D. (Chemical Oxygen Demand). At reaction end, the extent of the oxidation and the efficiency of the system are measured by determining the value of C.O.D. and the residual concentration of hydrogen peroxide.

The process according to the present invention makes it possible aromatic and aliphatic wastes to be oxidized within a very short time, with a very high yield and with low costs, and the treated liquors remain clear and transparent.

Furthermore, the process according to the present invention is cheap and compatible from environmental view point, because it takes place at room temperature, and with the use of reactants which do not leave environmentally toxic residues, and therefore do not cause phenomena of induced secondary pollution.

In order to better understand the present invention, some examples of practical embodiment are reported hereinunder, for merely illustrative and exemplifying, non-limitative purposes.

EXAMPLE 1

Aqueous solutions, each of which contained 50 ml of water and 1.5% of pure phenol, were oxidized by using the following systems:
(1) Peroxidase+catalase+$H_2O_2$;
(2) Peroxidase+$H_2O_2$.

In both systems, the aqueous solution was buffered at pH 6–6.5 with $NaHCO_3$ (end concentration 0.12M). The oxidation was carried out at room temperature with mild stirring, using, in system (1), a concentration of peroxidase of 10,000 U/l (Sigma Chem. Co., U.S.A.) and, simultaneously, a concentration of catalase of 5,200 U/l (Sigma Chem. Co., U.S.A.); whilst, in system (2), only peroxidase was used, at a concentration of 10,000 U/l. The reaction mixture was allowed to equilibrate over a few minutes.

The oxidation was initiated in both systems by adding, dropwise, 6.5 g/l of $H_2O_2$, very slowly, so as to keep hydrogen peroxide concentration in the reaction medium constantly comprised within the range of from 1 mM to 3 mM. The concentration of hydrogen peroxide was monitored by means of the permangate-based analytical procedure.

The results obtained demonstrate that in system (2), in which only peroxidase and $H_2O_2$ were used, the oxidation rate achieved during a 120-hour treatment time was of 42% of initial product, whereas the double-enzyme system (1) performs an oxidation of 67% during 120 hours.

EXAMPLE 2

According to the modalities of Example 1, waste waters from Company LERI containing, in mixture, 5.1% of phenol, 1.8% of formaldehyde and 4.3% of methanol, were oxidized according to the modalities of Example 1.

The following concentrations of systems (1) and (2) were used: 80 g/l of $H_2O_2$ at 100%, 20,000 U/l of peroxidase and 30,000 U/l of catalase [in system (1)]. Initial C.O.D. (Chemical Oxygen Demand) value was 147,000 mg/liter. The reaction time was of 96 hours.

The following results were obtained:

|  | System (1) | System (2) |
|---|---|---|
| Change in C.O.D. (%) | 41 | 32 |
| Change in [$H_2O$] (%) | 67 | 50 |
| Change in [PhOH] (%) | 50 | 20 |
| Change in [$H_2CO$] (%) | 100 | 100 |

EXAMPLE 3

Waste waters from Company Satef-Hutens containing 2.8% of phenol and a unidentified red complex were oxidized. The process was carried out according to the same modalities as of Example 1, with both systems (1) and (2), using the following concentrations: 150 g/l of $H_2O_2$ at 100%, 58,000 U/l of peroxidase and 30,000 U/l of catalase [in system (1)]. Initial C.O.D. value was 130,000 mg/liter. The reaction time was 48 hours.

The following results were obtained:

|  | System (1) | System (2) |
|---|---|---|
| Change in C.O.D. (%) | 43 | 33 |
| Change in [$H_2O$] (%) | 65 | 39 |
| Change in [PhOH] (%) | 62 | 49 |

EXAMPLE 4

An aqueous solution containing 1.63 g/l of $NH_3$ was oxidized by means of systems (1) and (2), according to the same modalities as of Example 1. The concentrations used in systems (1) and (2) were as follows: 4.68 g/l of $H_2O_2$ at 100%, 110,000 U/l of peroxidase and 19,000 U/l [in system (1)]. The reaction time was of 59 hours.

In system (1) (peroxidase+catalase+$H_2O_2$) according to the present process, an oxidation of 42% of $NH_3$ was obtained; in system (2) (peroxidase+$H_2O_2$), the oxidation % of $NH_3$ was of 27%.

The efficiency of the process according to the present invention is 2.1 times as high as of the system with peroxidase alone.

EXAMPLE 5

An aqueous solution containing 1.5% of benzene was oxidized by using systems (1) and (2), according to the same modalities as of Example 1. The concentrations used in systems (1) and (2) were as follows: 6.2 g/l of $H_2O_2$ at 100%, 10,000 U/l of peroxidase and 5,000 U/l of catalase [in system (1)]. The reaction time was of 96 hours.

In system (1) (peroxidase+catalase+$H_2O_2$) according to the present process, an oxidation of 67% of benzene was obtained, whereas in system (2) (peroxidase+$H_2O_2$), no oxidation of benzene took place.

The process according to the present invention is meaningfully more effective than the system with peroxidase and hydrogen peroxide.

EXAMPLE 6

An aqueous solution containing 100 ppm of styrene and 158 ppm of acetone, used as co-solvent, was oxidized by using systems (1) and (2), according to the same modalities as of Example 1. The concentrations used in systems (1) and (2) were as follows: 1.23 g/l of $H_2O_2$, 60,000 U/l of peroxidase and 19,500 U/l of catalase [in system (1); and 1.23 g/l of $H_2O_2$, 60,000 U/l of peroxidase]. The reaction time was of 25 minutes.

The following results were obtained:

|  | System (1) | System (2) |
| --- | --- | --- |
| Change in [$H_2O$] (%) | 65 | 96 |
| Change in [styrene] (%) | 98 | 85 |

The oxydation yield of system (1) can be obtained with system (2) by using a 2 times as long reaction time and 57% more of $H_2O_2$.

EXAMPLE 7

(Comparison Example, using molecular $O_2$)

An aqueous solution containing 1% of phenol buffered with 0.12M $NaHCO_3$ pH 7.0 was oxidized by means of the following systems:
(1) Peroxidase+catalase+$H_2O_2$;
(2) Peroxidase+$H_2O_2$;
(3) Peroxidase+$H_2O_2$+$O_2$;
(4) $O_2$ In systems (1)–(4), the following concentrations were used: 64,000 U/l of peroxidase; 5,200 U/l of catalase [in system (1)] and 8.8 g/l of $H_2O_2$ at 100%. The oxidation of the aqueous solution was carried out according to the operating procedure of Example 1. The reaction time was of 24 hours.

The following results were obtained:

|  | Change in [PhOH] (%) |
| --- | --- |
| System (1) | 86 |
| System (2) | 56 |
| System (3) | 55 |
| System (4) | 0 |

The results obtained in systems (2) and (3) demonstrate that molecular oxygen has no effect on the oxidation catalysed by peroxidase, and system (4) confirms once again that molecular oxygen does not oxidize the substrate.

On the contrary, the process according to the present invention—represented by system (1)—yields a very high oxidation percentage (86%). On considering the results of the other systems [(2), (3), (4)] it clearly appears that the rate of oxidation reaction catalysed by peroxidase alone is increased when catalase is simultaneously used.

We claim:
1. A process for the oxidative degradation of aromatic and aliphatic compounds contained in waste water, said process comprising treating said waste water with an aqueous enzymatic solution, said aqueous enzymatic solution comprising:
   (a) $H_2O_2$, and
   (b) peroxidase and an activated oxygen, or an enzyme which liberates activated oxygen from $H_2O_2$.
2. Process according to claim 1, characterized in that said enzymatic system is a double-enzyme one.
3. Process according to claim 1 characterized in that the enzyme which liberates activated oxygen from $H_2O_2$ is catalase.
4. Process according to claim 1, wherein the aqueous enzymatic solution comprises from 900 U/l to 10,000 U/l of the enzyme which releases activated oxygen from $H_2O_2$.
5. Process according to claim 1, wherein the aqueous enzymatic solution comprises from 2,000 U/l to 40,000 U/l of peroxidase.
6. Process according to claim 1, wherein the aqueous enzymatic solution comprises from 0.2 g/l to 10 g/l of $H_2O_2$ expressed as 100% peroxide
7. Process according to claim 1, wherein the pH value of the aqueous enzymatic solution is adjusted within the range of from 5.5 to 8.
8. Process according to claims 7, characterized in that the pH value is adjusted by means of buffering alkaline substances selected from sodium carbonate, sodium hydrogencarbonate, sodium acetate.
9. Process according to claim 1, wherein the process is carried out at a temperature of from 0° C. to 100° C.
10. Process according to claim 9, characterized in that the process temperature is room temperature.
11. Process according to claim 1, characterized in that a co-solvent is added to the aqueous solution.
12. Process according to claims 11, characterized in that said co-solvent is ethanol or acetone.
13. The process of claim 4, wherein the aqueous enzymatic solution comprises from 3,000 U/l to 8,000 U/l of the enzyme which releases activated oxygen from $H_2O_2$.
14. The process of claim 5, wherein the aqueous enzymatic solution comprises from 8,000 U/l to 25,000 U/l of peroxidase.
15. The process of claim 6, wherein the aqueous enzymatic solution comprises from 1.5 to 7 g/l of $H_2O_2$, expressed as 100% peroxide.
16. The process of claim 7, wherein the pH of the aqueous enzymatic solution is adjusted to a range of from 6 to 7.
17. The process of claim 9, wherein the process is carried out at a temperature of from 10° C. to 45° C.

* * * * *